(12) United States Patent
El Far et al.

(10) Patent No.: US 7,562,255 B2
(45) Date of Patent: Jul. 14, 2009

(54) CONFIGURABLE SYSTEM AND METHODS FOR WRITING AND EXECUTING TEST COMPONENTS

(75) Inventors: Ibrahim Khalil Ibrahim El Far, Bellevue, WA (US); Ivan Santa Maria Filho, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 531 days.

(21) Appl. No.: 11/201,798

(22) Filed: Aug. 11, 2005

(65) Prior Publication Data
US 2007/0038890 A1 Feb. 15, 2007

(51) Int. Cl.
*G06F 11/00* (2006.01)
(52) U.S. Cl. .......................... 714/38; 717/124; 717/125
(58) Field of Classification Search .................... 714/38; 717/124, 125
See application file for complete search history.

(56) References Cited

U.S. PATENT DOCUMENTS

| | | | |
|---|---|---|---|
| 6,223,306 B1 * | 4/2001 | Silva et al. ..................... 714/37 |
| 7,159,021 B2 * | 1/2007 | Boldman et al. ............. 709/223 |
| 7,174,542 B2 * | 2/2007 | Wang et al. .................. 717/124 |
| 2003/0145252 A1 * | 7/2003 | Grey et al. ..................... 714/38 |
| 2003/0208744 A1 * | 11/2003 | Amir et al. ................... 717/124 |
| 2005/0172268 A1 * | 8/2005 | Kuturianu et al. ........... 717/124 |
| 2005/0193291 A1 * | 9/2005 | Subramanian et al. ....... 714/710 |
| 2006/0015852 A1 * | 1/2006 | Parkinson et al. ........... 717/126 |

* cited by examiner

*Primary Examiner*—Yolanda L Wilson
(74) *Attorney, Agent, or Firm*—Workman Nydegger

(57) ABSTRACT

An automated and flexible architecture is provided that enables a plurality of component tests to be executed in various testing orders while imposing a test framework to mitigate adverse effects or results on previously developed tests. In one aspect, a computerized test system is provided. The system includes a test engine to execute a plurality of component tests. One or more application programming interfaces (API) are provided to selectively determine at a subset of the tests to execute, an execution order of the tests, or a fault response for the tests, if desired. The API determines a phase execution for the tests, where the phase execution can include a set up phase, an execution phase, a validation phase, a publishing phase, and a clean up phase, for example.

20 Claims, 11 Drawing Sheets

CONFIGURABLE SYSTEM AND METHODS FOR WRITING AND EXECUTING TEST COMPONENTS

BACKGROUND

In modern computing systems, software quality assurance (SQA) is an important part of verifying software components before actual deployment of the components by end users. This generally includes a planned systematic pattern of the actions necessary to provide adequate confidence that a product, component, or process by which the product is developed, conforms to established requirements. Also, SQA methods are more broadly applied to any software development such as to an updated version of commercial software to correct errors, resolve incompatibilities, or improve software performance.

In accordance with SQA methodology, software reliability considerations include the probability that software will not cause a system failure for a specified time under specified conditions. This probability is generally a function of one or more inputs to and use of the system in accordance with the software. The inputs to the system determine whether existing faults, if any, are encountered. Moreover, reliability estimates include the ability of a program to perform its required functions accurately and reproducibly under stated conditions for a specified period of time. Furthermore, reliability includes the probability that a given software component operates for some time period on the machine or machines for which it was designed, without system failure due to a software fault, given that it is used within design limits of the software.

To achieve the above goals, various forms of testing are generally applied to a system to determine how a given system performs under load. For example, this may include testing in which a system is subjected to unrealistically harsh inputs or load with inadequate resources with the general intention of breaking or faulting the system. For instance, this can include testing conducted to evaluate a system or component at or beyond the limits of its specified requirements. Generally, stress tests are designed to confront programs with abnormal situations. Thus, stress testing executes a system in a manner that may demand system resources in abnormal quantity, frequency, or volume.

One important component of system/component stress testing relates to load testing that attempts to stress systems by exercising components beyond that which is perceived or determined to be worst case operating conditions for the system. For instance, companies with mission critical web applications cannot afford to have poorly performing web sites as demand for the sites changes. As web site growth evolves, and systems are upgraded, the complexity of a company's web site architecture increases, for example. Thus, as components within the web architecture change, applications operating the sites are increasingly likely to encounter performance issues. Consequently, software applications can experience a great number of users with unpredictable load variations.

Some companies offer load testing applications to measure and predict the behavior and performance of an application on a global scale. This may include load testing both a determined infrastructure and architecture of an application by simulating a large number of users with many different profiles. Also, these applications can be combined with performance and transaction monitors in order to provide specific performance data for the different components of the application architecture. An output of these load and stress tests can be reports that identify in real-time any bottleneck and its cause that has been experienced by the system.

One problem with conventional stress and load testing methodologies is that merely testing a system at its breaking point or overload condition may not be the most efficient way to determine reliability let alone determine whether or not the software under test will reliably operate as specified. Another problem with conventional testing methodologies relates to the rigidity in which testing scenarios are constructed and subsequently executed. For instance, when a new test is incorporated into a suite of tests, previous tests may have to be re-written or eliminated in order to allow the new test to execute properly. Other problems relate to the fact that it may not always be desirable to execute tests in a predetermined order nor may it be desirable to execute one type of test during the execution of another. For instance, it may be desirable to apply certain faults, loads, or stresses to a system to observe system behavior without also requiring the system under test to be monitored for a particular failure or any type of failure during the observation period. In order to achieve these and other type of testing conditions, many tests often have to be redesigned to enable such testing flexibility.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A testing architecture having a suite of adaptable, programming interfaces is provided to enable flexible and automated testing of computer-related components. Conventional test frameworks are often loosely defined test frameworks, where developers write test code in any manner they want, with little guidance as to structure, little attention to quality basics, and little unification of approach as to how the tests are ultimately executed. The subject test architecture addresses this shortcoming by imposing a more robust testing structure and requirements with respect to the execution of a given test or "test subset" from a larger body of tests. This is achieved by providing one or more test component interfaces that enforce useful structure onto test cases as well as providing interfaces to writing highly configurable, hot-swappable test case executors that allow different engineers to enforce different rules of execution without breaking or disrupting tests authored by others. In this manner, a previous body of testing and expertise can be exploited while further enabling newer and flexible testing routines to be executed in addition to the previous tests. Also, a group of test engineers can save substantial time that they would otherwise have spent ensuring their tests run in non-administrative mode, suspending validation during stress test runs, addressing fault injection test scenarios, running tests concurrently, and/or changing the order or manner in which tests are generated and executed.

In one aspect, a test engine executes a plurality of tests that can be specified within a configuration file and in accordance with the programming interfaces described above. The file can specify particular test phases to execute such as a set up phase, an execution phase, a validation phase, and so forth, where respective phase can be selectively switched in or out for a desired suite of tests. The configuration file and interfaces promote flexibility by allowing previous test cases and scenarios to be leveraged while allowing alternative testing approaches to be implemented. By employing the respective interfaces, cooperation with previously written tests can be enhanced while mitigating the likelihood that newer tests will no longer be compatible with previous testing routines.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An automated and flexible architecture is provided that enables a plurality of component tests to be executed in various testing orders while imposing a test framework to mitigate adverse effects or results on previously developed tests. In this manner, previously authored tests can be exploited for further testing while enabling future tests to be developed, incorporated, and selected. This includes selective switching of tests or phases such as validation or fault injection to allow various testing scenarios. In one aspect, a computerized test system is provided. The system includes a test engine to execute a plurality of component tests. One or more application programming interfaces (API) are provided to selectively determine a subset of the tests to execute, an execution order of the tests, or a fault response for the tests, if desired. The API determines a phase execution for the tests, where the phase execution can include a set up phase, an execution phase, a validation phase, a publishing phase, and a clean up phase, for example.

As used in this application, the terms "component," "object," "interface," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
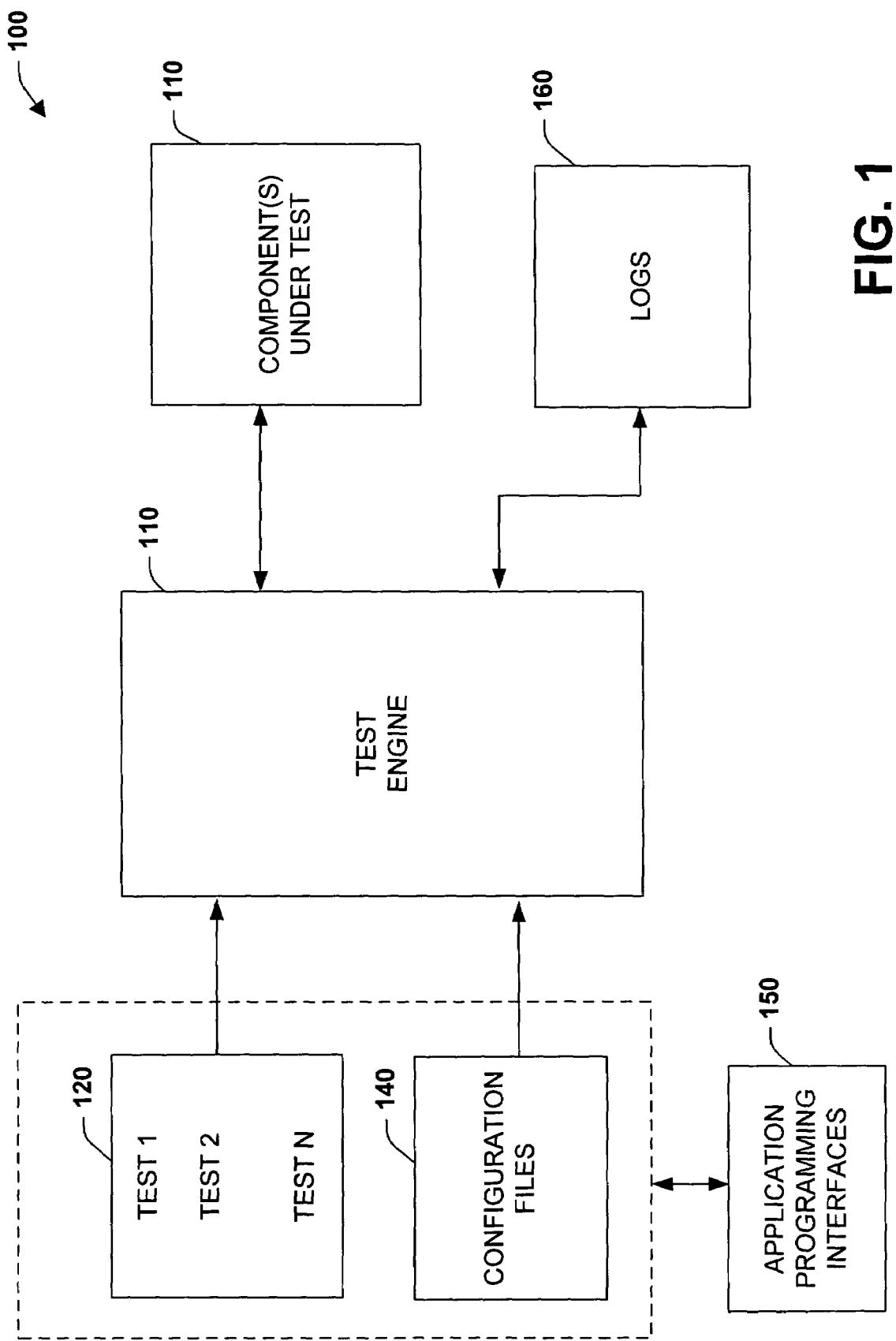
FIG. 1 is a schematic block diagram illustrating an automated testing system.

Referring initially to FIG. 1, an automated component testing system 100 is illustrated. The system 100 includes a test engine 110 that executes a test subset 120 on one or more components under test 130. The components under test 130 can include substantially any type of computer component such as hardware, software, network components, input/output (I/O) components, buses, memory, processors, databases, peripherals, and so forth. Also, the test subset 120 can include zero or more tests to be executed on the test components 130. A configuration file 140 is provided to guide the execution and ordering of tests and in some cases whether or not one subset of tests 120 is executed during the execution of other test subsets 120. To facilitate interactions and specifications of the test subsets 120 and configuration files 140, one or more application programming interfaces 150 (APIs) are provided to serve as a guide for implementing new tests and to mitigate disruption of previously written tests 120. A log or database component 160 can be provided to facilitate publishing and recording of desired test results, where the log can be served locally and/or remotely such as across the Internet for example.

Unlike other loosely defined test frameworks, where developers write test code in any manner they want, with little guidance as to structure, little attention to quality basics, and little unification of approach as to how the tests are ultimately executed, the system 100 imposes a structure and guideline requirement for testing via the APIs 150. In terms of requirements, writing test components should generally be efficient and address several problems at once, if possible. Specifically, without changing an existing code base or test subset 120, a developer should be able to run the same tests with any user privileges, even if some test initialization or cleanup may require administrative privileges. They should also be able to run the same tests without validation to assess performance of a system under stress, as the additional validation code can hinder a better assessment of the resilience of the software under test. Other features include running the same tests under faulty conditions, with minimal additional code. Alternate validation code that expects specific errors or exceptions can be swapped or switched in place of the original validation code that evaluates the test results under normal conditions.

In terms of structure, the developer should also be able to specify and distinguish between key phases of testing in order to have a fine grain control over what to execute, when to execute it, how to handle failures in each phase, optionally replacing one of the phases, and satisfying other aforementioned goals. For example, these phases can include set up, execution (main object of test code), validation (main mechanism of determining whether results are suitable), publishing (mechanism for copying or post-processing logs), and a clean up phase. As can be appreciated, other phase can be provided if desired depending on the desired testing granularity.

Other aspects to the system 100 include the ability to define a workflow of execution that determine how and when tests are executed, how/when test groups are generated/enumerated and their tests executed, and how/when test modules (physical groupings of tests) are generated/enumerated and their groups/tests processed/executed. The APIs 150 and configuration files 140 allow replacing substantially any component of the system 100 while mitigating failures in other test subsets that choose to abide by imposed contracts of the APIs 150 in a different manner. To meet these and other goals, a set of lightweight interfaces 150 are provided that are easy to use by developers along with a set of convenience default implementations of these interfaces. Beyond basic contracts imposed by the interfaces 150, developers are generally under no other system constraints.

Figure 2:
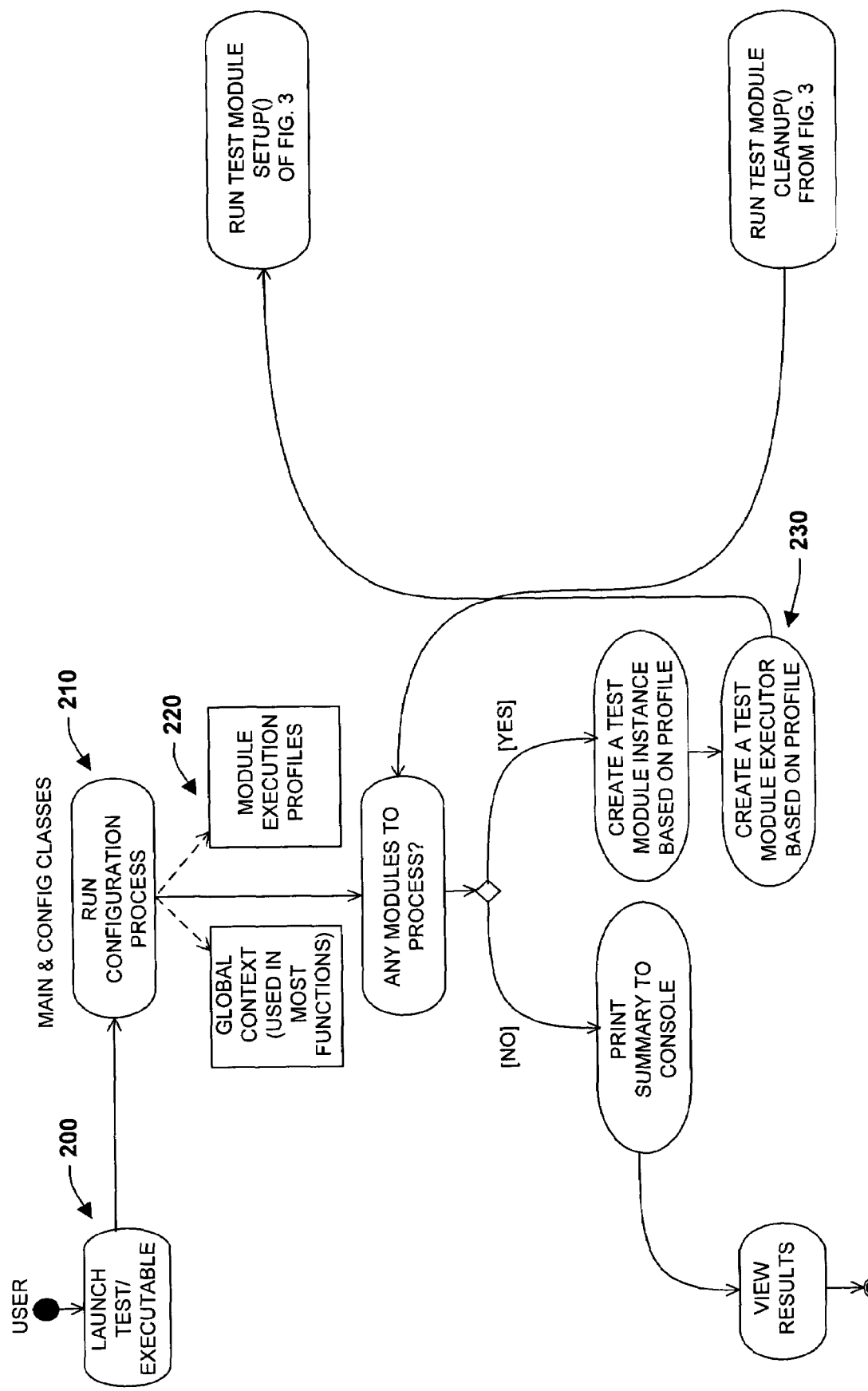
FIGS. 2-4 illustrate an automated testing process.
Figure 3:
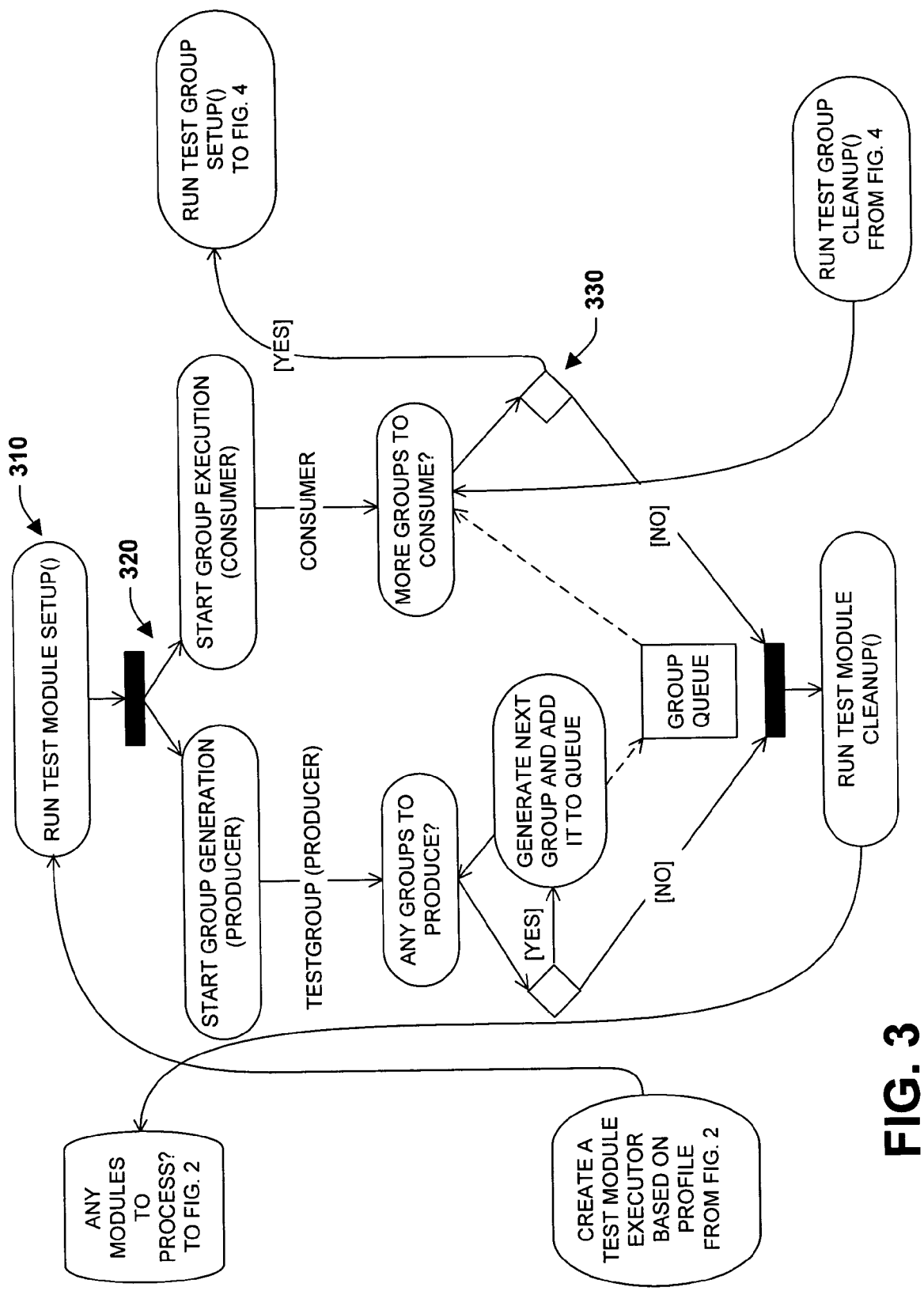
Figure 4:
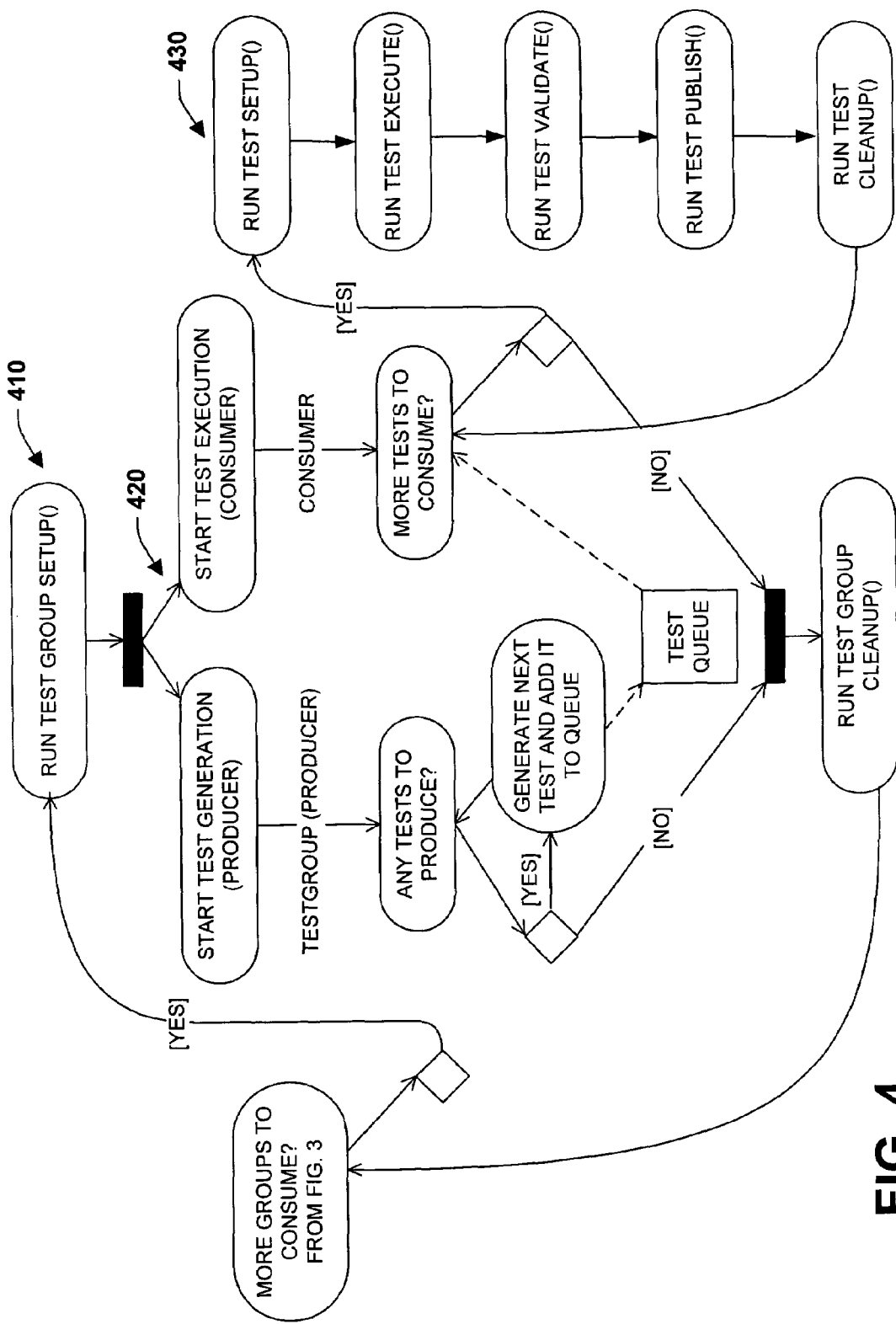

Referring now to FIGS. 2-4, an automated testing process is illustrated. While, for purposes of simplicity of explanation, the process is shown and described as a series or number of acts, it is to be understood and appreciated that the subject process is not limited by the order of acts, as some acts may, in accordance with the subject process, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject process.

FIGS. 2-4 illustrate a modular framework and process for executing various testing modules and will be described collectively as a group. Proceeding to 200 of FIG. 2, a console user launches a test execution console, and control is taken over by the main class of the utility at 210. From there, the utility goes through a process of interpreting configuration sources and storing relevant information appropriately at 220. Generally, relevant data is stored in a dictionary of information that is referred to as a global context. The global context contains metadata, system settings, and other data for executors, test groups, and tests to work appropriately. When the configuration process is complete, in addition to the global context, a list of module profiles describing the list of modules to be executed and how they are going to be executed is also obtained. The utility's main class then takes over again. For each module it finds that it has not processed, it creates an instance of the test module executor class and passes on the test module and global context at 230.

Proceeding to 310 of FIG. 3, when a test module executor starts, it first runs the module set up. When the set up is complete, two threads are created at 320: a consumer and a producer of test groups. The consumer and producer communicate via a private queue of test groups. In the producer thread the test module test group generation function produces test groups. In the consumer thread, a consumer function consumes test groups by executing them. The consumer performs that by creating an instance of a test group executor and passing on the instance of the test group it has just consumed as well as the global context at 330.

Proceeding to 410 of FIG. 4, when a test group executor starts, it first runs a group set up. When the set up is complete, two threads are created at 420: a consumer and a producer of tests. The consumer and producer communicate via a private queue of tests. In the producer thread, a test group test generation function produces tests. In the consumer thread, a consumer function consumes tests by executing them. The consumer performs that by creating an instance of a test executor and passing on the instance of the test it has just consumed as well as the global context.

At 430 of FIG. 4, when a test executor starts, it runs the test set up, then test execution, then test validation, and then test publishing, and finally test clean up. It performs this synchronously in the sense that it can execute one step after the previous step is complete. Finally, the test executor's role is complete. When the test group producer and consumer threads finish as illustrated in FIG. 3, the test group executor runs the group clean up. The test group executor's job is complete. When the test module producer and consumer threads finish at 420, the test module executor runs the module clean up. The test module executor's job is now complete. Generally, the utility's main class keeps invoking this process in FIGS. 2-4 until there are no more modules to process, at which point it prints a summary of results to the console and terminates. Also, logging of results can occur as previously described. The user is then free to start another run of the utility, if desired.

Figure 5:
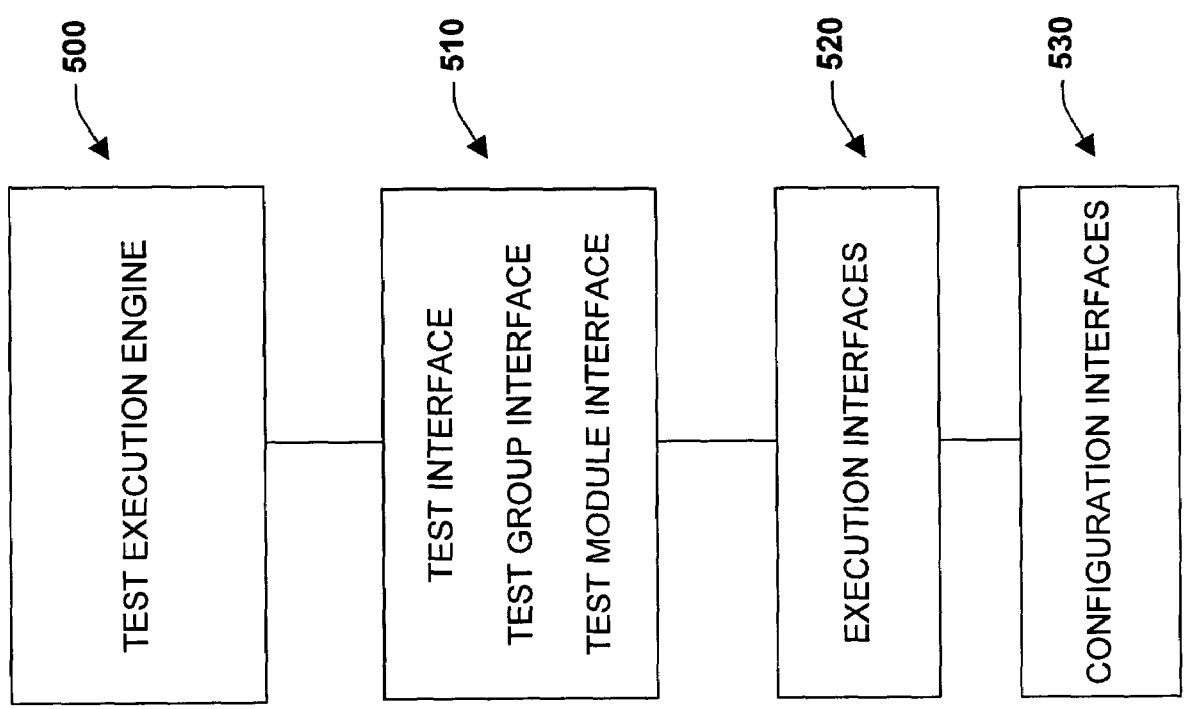
FIG. 5 illustrates example interface classes that can be employed for interacting with a test engine.

Referring to FIG. 5, example test classes are illustrated that can be employed with a test execution engine 500. Several interfaces define contracts for authoring test cases, test groups, test modules, as well as execution workflow for running test cases, test groups, and test modules. At 510, test interfaces, test group interfaces, and test module interfaces are provided. The test interface distinguishes several phases of tests. It addresses test structure and organization, stress run requirements, fault injection requirements, and security context requirements, for example. The test group interface addresses the need for organizing test cases, the need for generating test cases, as well as the need for set up and clean-up activities common to a collection of test cases. The test module interface addresses the need to group test groups in a physical entity or module such as a managed assembly, an unmanaged library, an XML file that defines a collection of test groups, and so forth. The test module also addresses the need for common setup and clean-up activities common to a collection of test groups.

Three interfaces define how test modules, test groups, and tests are executed at 520. These execution interfaces address the need to actually execute test cases that are, possibly, defined in groups that are defined in various modules. This also promotes modularity and extensibility, where the behavior for executing test cases, test groups, or test modules may be changed for some test authors without affecting others.

At 530, a configuration interface can be provided that defines a contract for reading the global context under which test cases run. The global context is a collection of key-value pairs that define such global configuration values such as command line parameters, system settings, test metadata, and so forth. This global context is then passed to most functions of the interfaces described above. It is noted that the test execution engine 500 provides a number of default and convenience implementations. For example, a base test class implements properties with appropriate validation and implements functions as abstract methods to be implemented by inheriting classes. Another example is a test group implementation that organizes test instances by having the author specify the test classes.

Figure 6:
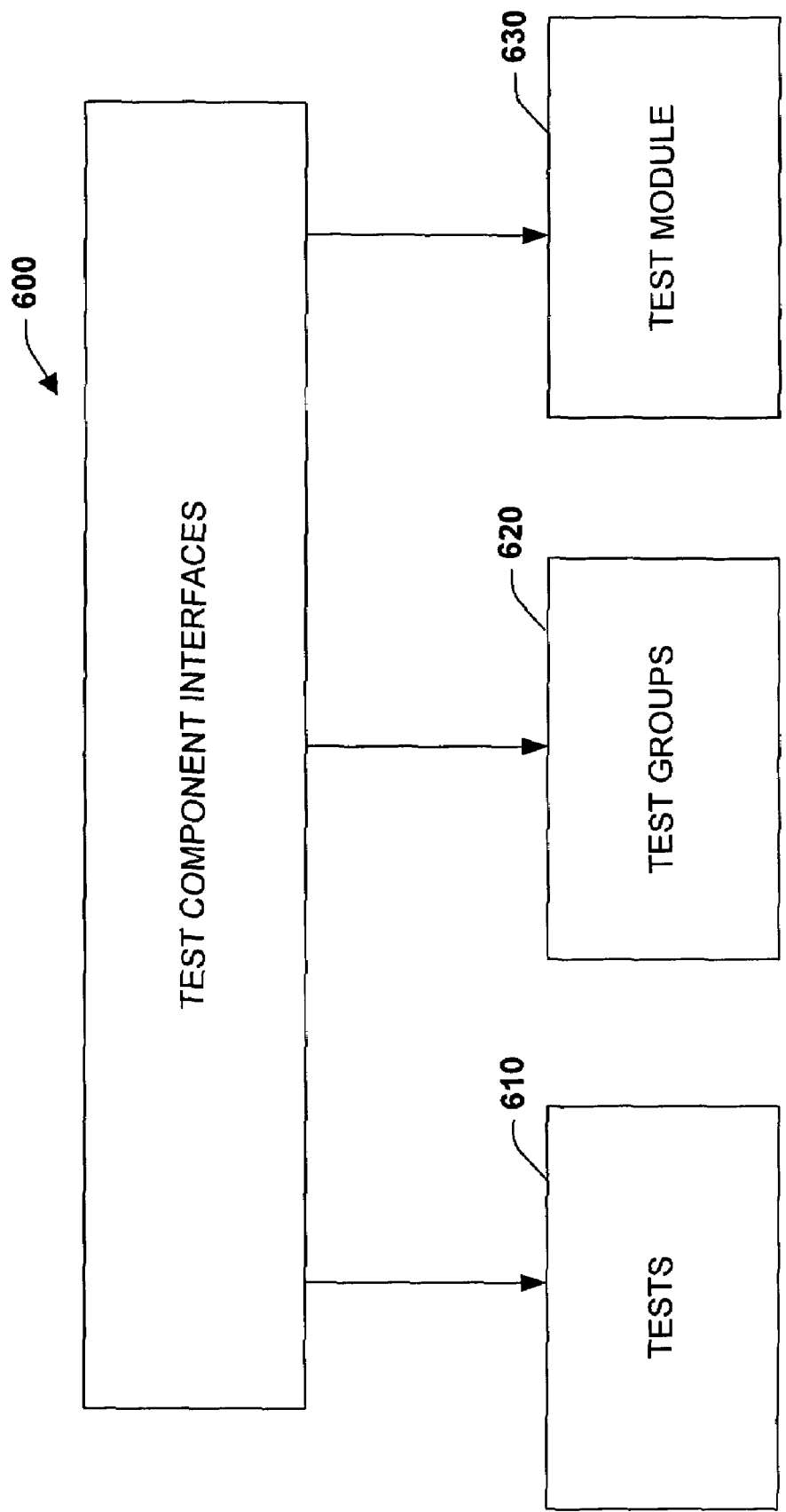
FIG. 6 illustrates example test component interfaces for interacting with a test engine.

FIG. 6 illustrates example test component interfaces 600 that can be employed with a test engine. At 610, one or more test interfaces are provided. These define the contract between the test execution engine and test authors. Test classes are expected to implement this interface, which generally consists of five functions and one property as follows.

```
public interface ITest
{
    void SetUp(IDictionary context);
    void Execute(IDictionary context);
    void Validate(IDictionary context);
    void Publish(IDictionary context);
    void CleanUp(IDictionary context);
    IDictionary Metadata {set; get;}
}
```

Generally, the five functions correspond to five typical phases of a test including: Set up, during which required initialization is performed. This may require administrative privileges. This typically has to synchronously run before any other phase of the test. Execution, during which the actual test scenario is performed. The privileges required here depend on the scenario. This usually synchronously follows set up and precedes any other phase of the test. Validation, during which the execution results are evaluated and the test is determined to pass or fail. This may require administrative privileges. This usually synchronously follows execution and precedes publishing. Publishing, during which local logs are published to a well known, possibly public location that can be viewed by others. This includes preparing links to local files, transforming logs from one format to another, or any other post processing. This may require administrative privileges and generally follows validation and precedes clean-up. Clean up, during which required un-initialization is performed. This may require administrative privileges where the end of clean-up concludes the test execution.

The argument to each of the five functions is a dictionary that represents the global context under which the test is running. The context contains such information as the parsed command line parameters, processed configuration file information, system settings, and any other information that is useful in configuring the behavior of the test. Test metadata is a collection of key value pairs that represent useful information about the test. The engine can require that the metadata contain a definition of the name of a test using the key "Name." The following is an example of how to reference and manipulate the name of a test:

```
ITest test = new MyTest( );
test.Metadata["Name"] = "MyTestName";
Console.WriteLine(test.Metadata["Name"]);
```

A test name is a string identifier that uniquely identifies a test relative to a test group. The test author is responsible for assigning an appropriate name to the test. The engine generally enforces the relative uniqueness of test names.

Proceeding to 620, Test Groups interfaces are provided. The following interface defines the contract between the test execution engine and test group authors. It typically addresses three needs which include: Need for test organization; Need for dynamic test generation; and Need for common set up and clean-up for a group of tests. The following code is an example:

```
public interface ITestGroup
{
    void SetUp(IDictionary context);
    void GenerateTests(IDictionary context);
    void CleanUp(IDictionary context);
    IDictionary Metadata {set; get;}
}
```

The three functions in the example are, respectively: Set up; during which common initialization is performed. Test generation; during which tests that belong to this test group are produced. This may be synchronous or asynchronous to test execution or even the set up or clean up functions of the group. This specific model lends itself to any push-modeled generation. Clean up; during which common un-initialization is performed. One reason to having set up and clean up functions at the group level is to address the need for common set up and clean-up. This need usually arises when set up or clean up operations are too expensive to repeat for every test.

At 630, Test Module interfaces are provided. The test module is an organizational unit that is similar to a test group save for the following: It corresponds to a physical organization of test groups, such as an assembly and it does not have or need a name, since it is identified by a physical entity.

```
public interface ITestModule
{
    void SetUp(IDictionary context);
    void GenerateTestGroups(IDictionary context);
    void CleanUp(IDictionary context);
}
```

Figure 7:
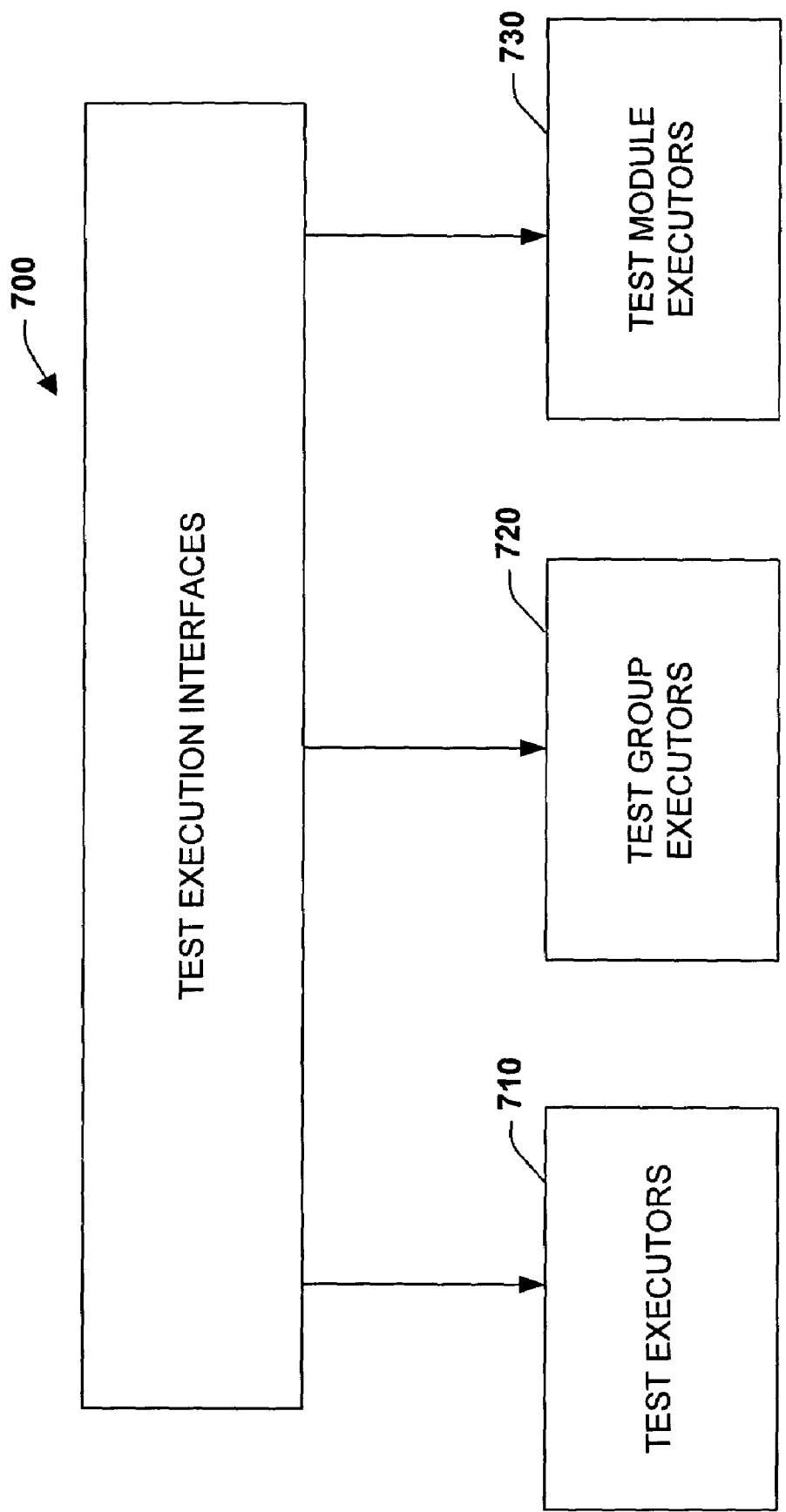
FIG. 7 illustrates example test execution interfaces for interacting with a test engine.

FIG. 7 illustrates example test execution interfaces that can be employed with a test execution engine. At 710, one or more Test Executors can be provided. The following interface defines a contract between the test execution engine and the test author on how to implement the workflow for executing tests. Such an implementation is called a test executor. The interface typically consists of one function that takes two arguments including the test instance to be executed and the global context under which the test is executed. This interface addresses the need to execute test cases. Isolating the implementation of test executors from the implementation of the remainder of the execution process provides for extensibility and configurability.

```
public interface ITestExecutor
{
    void Run(ITest test, IDictionary context);
}
```

At 720, interfaces for Test Group Executors are considered. These are similar to a test executor described above. A test group interface implements the work flow of running the test group test setup, test group clean up, generating tests, and executing test cases. The test group executor does not dictate how any given test is executed, which is left up to the test executor.

```
public interface ITestGroupExecutor
{
    void Run(ITestGroup testGroup, IDictionary context);
}
```

At 730, interfaces for Test Module Executors are provided. These are also similar to a test executor. A test module interface implements the work flow of running the test module set up, test module clean up, test group generation, test group test setup, test group clean up, generating tests, and executing test cases. The test group executor does not dictate how a test group is executed or how a test is executed, which are left up to the test group executor and the test executor, respectively.

```
public interface ITestModuleExecutor
{
    void Run(ITestModule testModule, IDictionary context);
}
```

Figure 8:
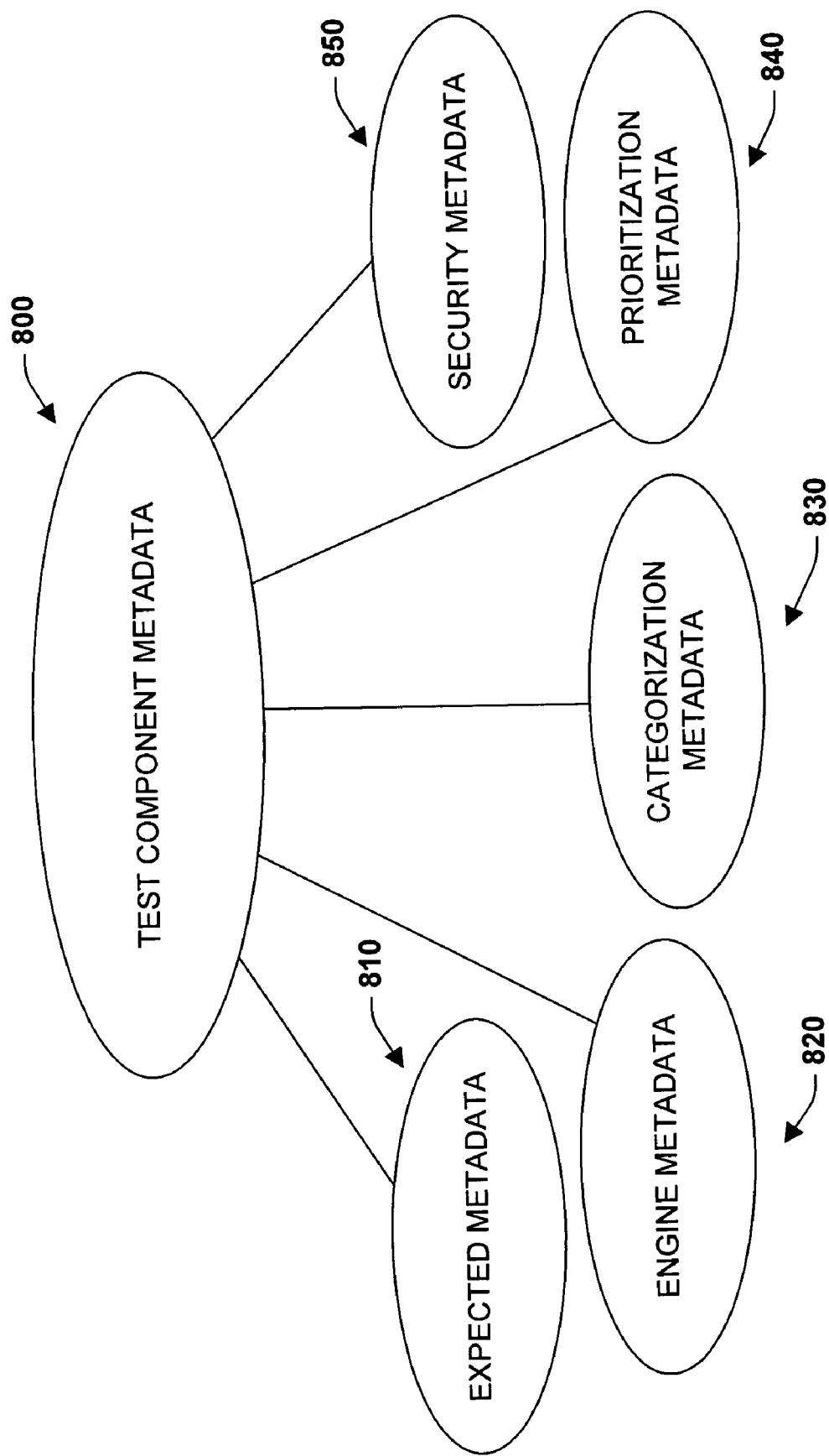
FIG. 8 illustrates example test component metadata for interacting with a test engine.

Referring to FIG. 8, example test component metadata 800 is illustrated that can be employed with a test execution engine. For convenience, test components are often decorated with metadata. For example, test groups have names and tests have priorities. Test modules are test components that do have metadata; they are considered mere physical organizations of tests and test groups without any additional meaning attached.

The test execution engine expects certain metadata to be supplied by test component authors. For example, a test author should supply its name. Metadata is the primary mechanism for filtering interesting tests from a large pool of tests. Metadata may also be used by other libraries to organize and sort tests and test results. The test execution engine also supplies metadata that describes the test components it requires to run. Such metadata is stored in the global context. For example, the test execution engine may communicate to the generator of a test group that only functional tests with priority 2 are going to be executed.

Proceeding to 810, Expected Metadata is described. This can include a Name, a string unique relative to a test group; an Area, a string; an Author, a string; an Associated bugs, a string; a Priority, an enumerated value; a Category, an enumerated value; and/or a User group options, an enumerated flag value. User group options define the user groups the privileges of which are employed in order for the test to successfully execute. At 820, engine supplied metadata may include: a Test Name; a Group Name; an Author; Associated bugs; a Priority; a Category; or User group options.

At 830, Categorization Metadata is considered. This is used to specify the category of a test or specify categories of a test to be selected for execution.

```
public enum TestCategory : byte
{
    AllCategories = 0xFF,
    Functional = 0x1,
    Performance = 0x2,
    Stress = 0x4
}
```

In the following example, only functional tests are generated. The category of tests to be generated is specified in a global context using the appropriate metadata keys.

```
public class MyFunctionalTestGroup : ITestGroup
{
    ...
    public GenerateTests(IDictionary context)
    {
        // Generate tests only if functional tests are required.
        If ((TestCategory)context[MetadataKeys.Category] ==
TestCategory.Functional)
        {
            // Generate the functional tests.
        }
    }
    ...
}
```

Proceeding to 840, Prioritization Metadata is provided. This is used to specify the priority of a test or specify the priorities of a collection of tests.

```
public enum TestPriority : byte
{
    AllPriorities = 0xFF,
    P0      = 0x01,
    P1      = 0x02,
    P2      = 0x04,
    P3      = 0x08
}
```

In the example, the priority of a test is used to determine whether to write something to the console.

```
public class MyTest : ITest
{
    ...
    void Setup(IDictionary context)
    {
        ...
        if ((TestPriority)context[MetadataKeys.Priority] ==
TestPriority.P0)
        {
            Console.WriteLine("The test is a P0 test.");
        }
        ...
    }
    ...
}
```

At 850, Security Metadata is provided. This is used to specify a collection of user groups, for example to run a given collection of tests under the privileges of different users that are members of a number of groups.

```
public enum UserGroupOptions : ushort
{
    AllGroups                   = 0xFFFF,
    Administrators              = 0x0001,
    BackupOperators             = 0x0002,
    Guests                      = 0x0004,
    NetworkConfigurationOperators = 0x0008,
    PowerUsers                  = 0x0010,
    RemoteDesktopUsers          = 0x0020,
    Replicator                  = 0x0040,
    Users                       = 0x0080,
    DebuggerUsers               = 0x0100,
    HelpServicesGroup           = 0x0200,
    OfferRemoteAssistanceHelpers = 0x0800,
}
```

Figure 9:
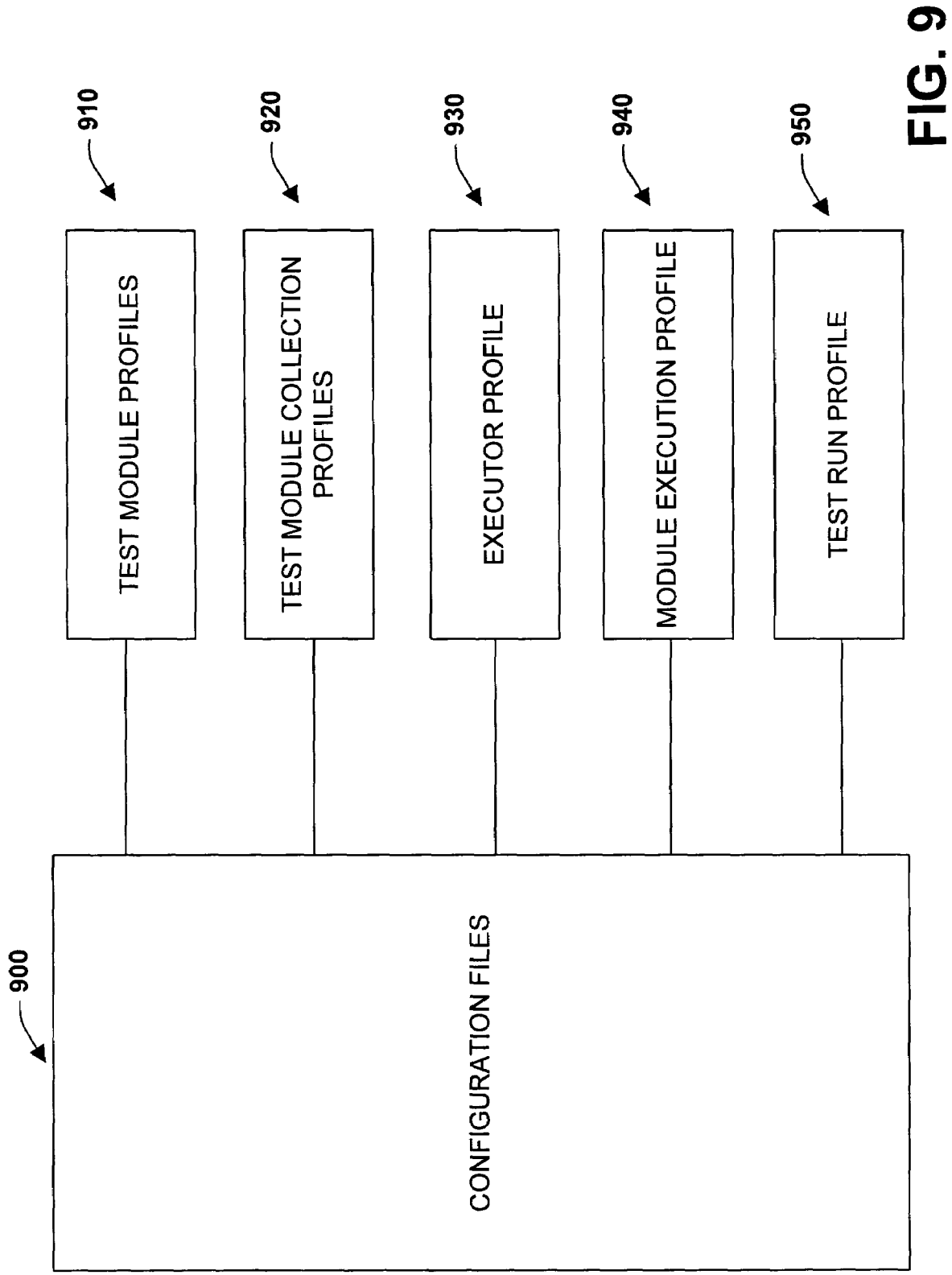
FIG. 9 illustrates example configuration files for interacting with a test engine.

FIG. 9 illustrates example configuration files 900 that can be employed for automated testing. Before proceeding with a description of the configuration files 900, an example configuration process is described. When a user launches a test execution console, control is taken over by the main class of the utility. Based on an initialization file that may be configured by users desiring to extend or adjust the configuration of the engine, at least four aspects are determined:

1. How the global context (dictionary of useful, global information) is read. The initialization file is expected to define a global context reader class.
2. How the configuration file is read and module execution information extracted. The initialization file is expected to define a configuration file reader class.
3. How a test module is created. The initialization is expected to define a test module builder class.
4. How a test module executor is created. The initialization is expected to define a test module executor class.

After the initialization file is interpreted and the above mentioned classes are identified, the main class proceeds to creating an instance of the global context reader and calling the appropriate function on that instance. The global context reader interprets the system's environment and parses the command line arguments, storing the information in a new object, i.e., the global context. The utility's main class takes over again. Now that the initialization file, system environment variables, and command line arguments are processed, it moves to processing the configuration file by creating an instance of the configuration file reader class and calling the appropriate function on that instance.

The configuration file reader parses the configuration file and extracts a list of module execution profiles that are used to identify and instantiate test modules, test executors, test group executors, and test module executors. This process is guided by the global context to identify those modules that are interesting for the specific run that the user specified when the utility was launched. The utility's main class takes over as soon as the profile list is returned. It first checks if there are any module execution profiles. If there are not any, then it prints a summary to the console and terminates. If there are modules profiles defined, then a test module builder is created and run. The test module builder creates an instance of a test module based on elements of the module execution profile. The utility's main class then creates a test module executor builder that creates a test executor.

One type of profile that can be provided are Test Module Profiles at 910. Test modules may be defined using the module XML element. In the simplest form, the test author specifies the name of the assembly file that constitutes the module. The name of the assembly file identifies a module. For example, <ModuleProfile FileName="ExampleTests.dll" />

If the test author does not use the default module type (managed test module,) the author may define the module type by specifying the name of the type and the assembly file in which it exists. For example,

```
<ModuleProfile FileName       = "ExampleTests.dll"
    ModuleTypeId              = "MyTestModule"
    ModuleTypeLibrary         = "MyTestModule.dll" />
```

In the previous example, the test author is responsible for providing the implementation of test module in the sources for MyTestModule.dll sources:

```
public class MyTestModule : ITestModule
{
    ...
}
```

At 920 of FIG. 9, Test Module Collection Profiles are provided. Test authors may define a collection of modules as follows. Metadata collections are identified by a name. For example,

```
<ModuleCollectionProfile Name = "MyModuleCollection" >
    <ModuleProfile FileName = "ExampleTests1.dll" />
    <ModuleProfile FileName = "ExampleTests2.dll" />
    <ModuleProfile FileName       = "ExampleTests3.dll"
        ModuleType                = "MyTestModule"
```

```
        ModuleAssemblyFileName = "MyTestModule.dll" />
    <ModuleProfile FileName       = "ExampleTests4.xml"
        ModuleType                = "MyXmlTestModule"
        ModuleAssemblyFileName = "MyXmlTestModule.dll" />
</ModuleCollectionProfile>
```

In the previous example, the first two modules are managed test modules as defined by the test execution engine. The second module is also a managed test module, and the corresponding test module class is specified. The third module is an XML file, and the corresponding test module class that implements XML modules is specified.

At 930, an Executor Profile is provided. The behavior of the test execution command line utility is defined by the specific implementation used for the following interfaces: Test module executor, Test group executor and/or Test executor. By default, the engine behavior profile is as follows, using the default implementations of the four interfaces:

```
<ExecutorProfile Name="Default">
    <TestModuleExecutor
        Type = "System.Storage.Test.TestModuleExecutor"
        Assembly = "System.Storage.Test.TestExecutionEngine" />
    <TestGroupExecutor
        Type = "System.Storage.Test.TestGroupExecutor"
        Assembly = "System.Storage.Test.TestExecutionEngine" />
    <TestExecutor
        Type = "System.Storage.Test.TestExecutor"
        Assembly = "System.Storage.Test.TestExecutionEngine" />
</ExecutorProfile>
```

To change the behavior of the console for a collection of test modules, the test author should define a new profile with the appropriate classes that implement the new behavior. At 940, a Module Execution Profile can be provided. The module collection configuration defines: What modules to consider and What executor profile to use with these modules.

```
<ModuleExecutionProfile Name = "Sync">
    <ExecutorProfile          Name = "Default" />
    <ModuleCollectionReference  Name = "SyncModuleCollection1" />
    <ModuleCollectionReference  Name = "SyncModuleCollection2" />
</ModuleExecutionProfile>
```

The test author may define as many of these configurations as needed. Also, the test author may define test filters to select a subset of the tests in a collection of modules to include in one run or the other. At 950, a Test Run Profile may be provided. To define a test run, a test author must specify the configurations used in the run, which are collections of test modules and an engine behavior profile to be used with these modules. Also, a test filter can be specified that selects tests in the module intended for the test run.

Figure 10:
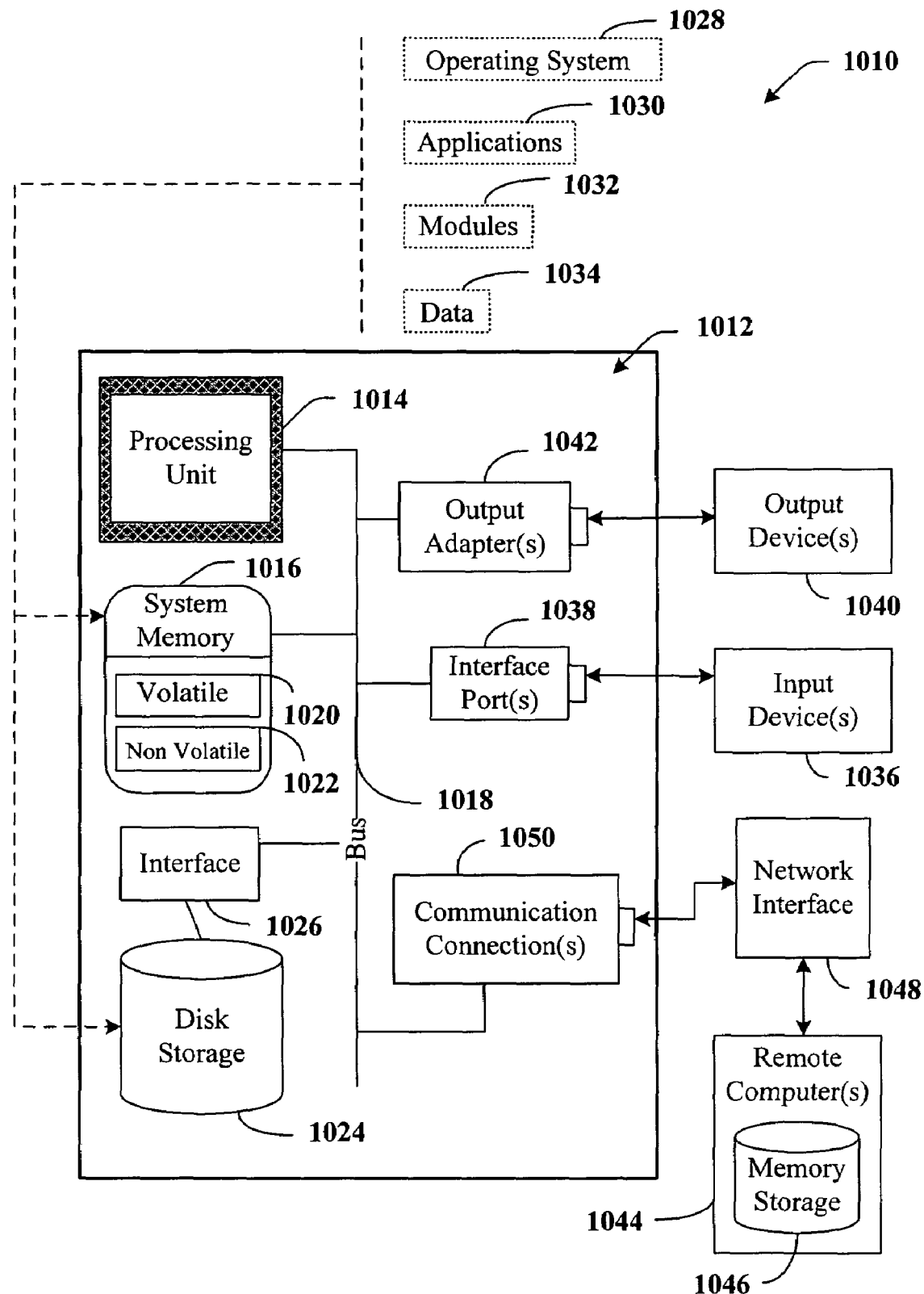
FIG. 10 is a schematic block diagram illustrating a suitable operating environment.
Figure 11:
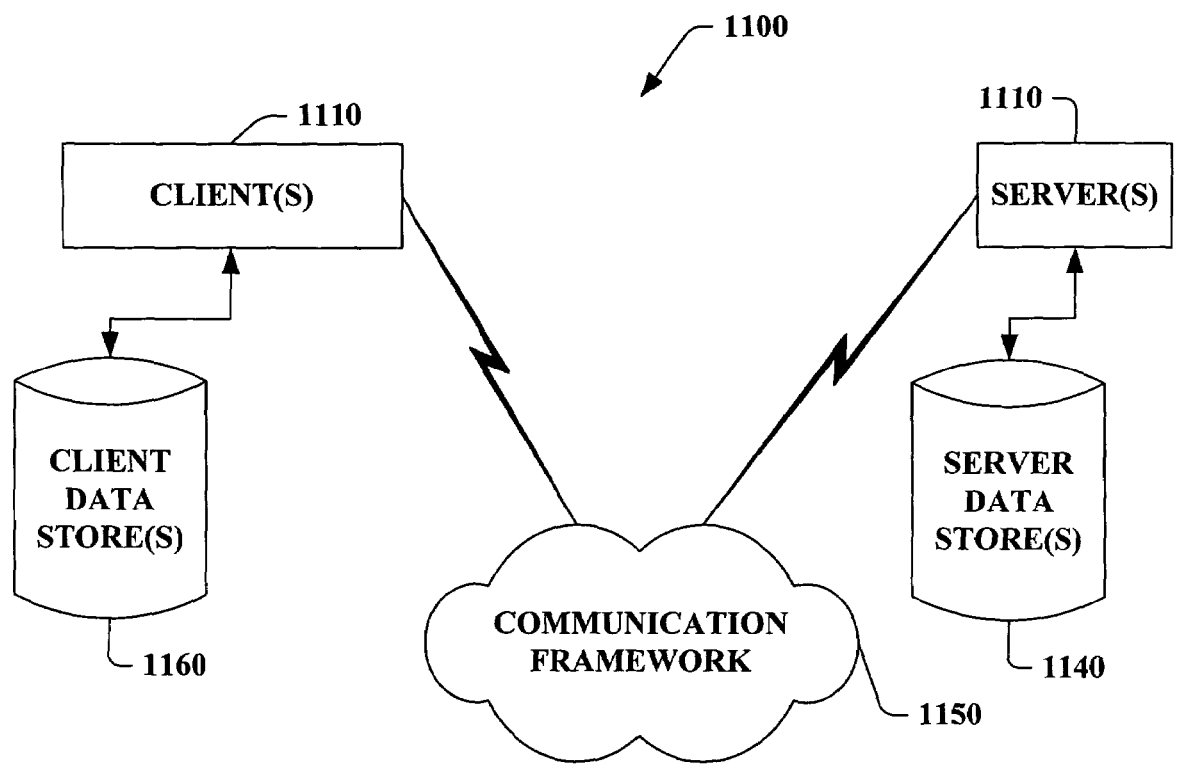
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects described herein includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computerized test system embodied on a computer-readable storage medium, the system comprising:
    a test engine to execute a plurality of component tests;
    at least one application programming interface (API) to selectively determine at least one of a subset of the tests to execute, an execution order of the tests, and a fault response for the tests; and
    categories of metadata to facilitate operations of the test engine, the metadata categories include default metadata, test engine metadata, categorization metadata, prioritization metadata, and security metadata.

2. The system of claim 1, the API determines a phase execution for the tests.

3. The system of claim 2, the phase execution includes a set up phase, an execution phase, a validation phase, a publishing phase, and a clean up phase.

4. The system of claim 1, further comprising a log component to publish the results of the component tests.

5. The system of claim 1, the component tests are initiated and executed as part of a producer and a consumer thread.

6. The system of claim 5, further comprising at least one configuration file to facilitate execution of the component tests.

7. The system of claim 6, the at least one configuration file includes at least one of a test module profile, a test module collection profile, an executor profile, a module execution profile, or a test run profile.

8. The system of claim 6, further comprising a component to create a test instance based on the at least one configuration file.

9. The system of claim 6, further comprising a queue to facilitate execution of component tests.

10. The system of claim 6, the configuration file defines the order of test execution and whether a first subset of tests are executed during execution of a second subset of tests.

11. The system of claim 5, wherein a test group test generation function produces tests in the producer thread, and a consumer function executes the tests in the consumer thread.

12. The system of claim 1, the API includes at least one of a test interface, a test group interface, a test module interface and a configuration interface.

13. The system of claim 1, the API includes at least one of a test executor interface, a test group executor interface, or a test module executor interface.

14. The system of claim 1, the metadata is specified as an extensible markup language (XML).

15. The system of claim 1, further comprising a dictionary component to store global context information for the test engine.

16. The system of claim 1, further comprising a computer readable medium having computer readable instructions stored thereon for implementing the test engine or the API.

17. A computerized testing method, comprising:
    reading a plurality of configuration files;
    employing a programming interface to update the configuration files;
    associating context switches within the configuration files for activating or deactivating component tests;
    automatically executing the component tests based in part on the configuration files; and
    employing metadata to program the configuration files, the metadata categories include default metadata, test engine metadata, categorization metadata, prioritization metadata, and security metadata.

18. The method of claim 17, the programming interface includes a test component interface, a test execution interface, or a configuration interface.

19. The method of claim 17, further comprising executing the component tests as part of a producer and a consumer thread.

20. A system embodied on a computer-readable storage medium that facilitates automated component testing, the system comprising:
    means for processing a plurality of configuration files;
    means for programming the configuration files;
    means for switching within the configuration files for activating or deactivating a plurality of component tests;
    means for executing the component tests based on the configuration files; and
    means for employing metadata to program the configuration files, the metadata categories include default metadata, test engine metadata, categorization metadata, prioritization metadata, and security metadata.

* * * * *